Aug. 27, 1946.   S. J. WINSLOW   2,406,450
VANITY FOR AUTOMOBILE COMPARTMENTS
Filed Aug. 17, 1945   2 Sheets-Sheet 1
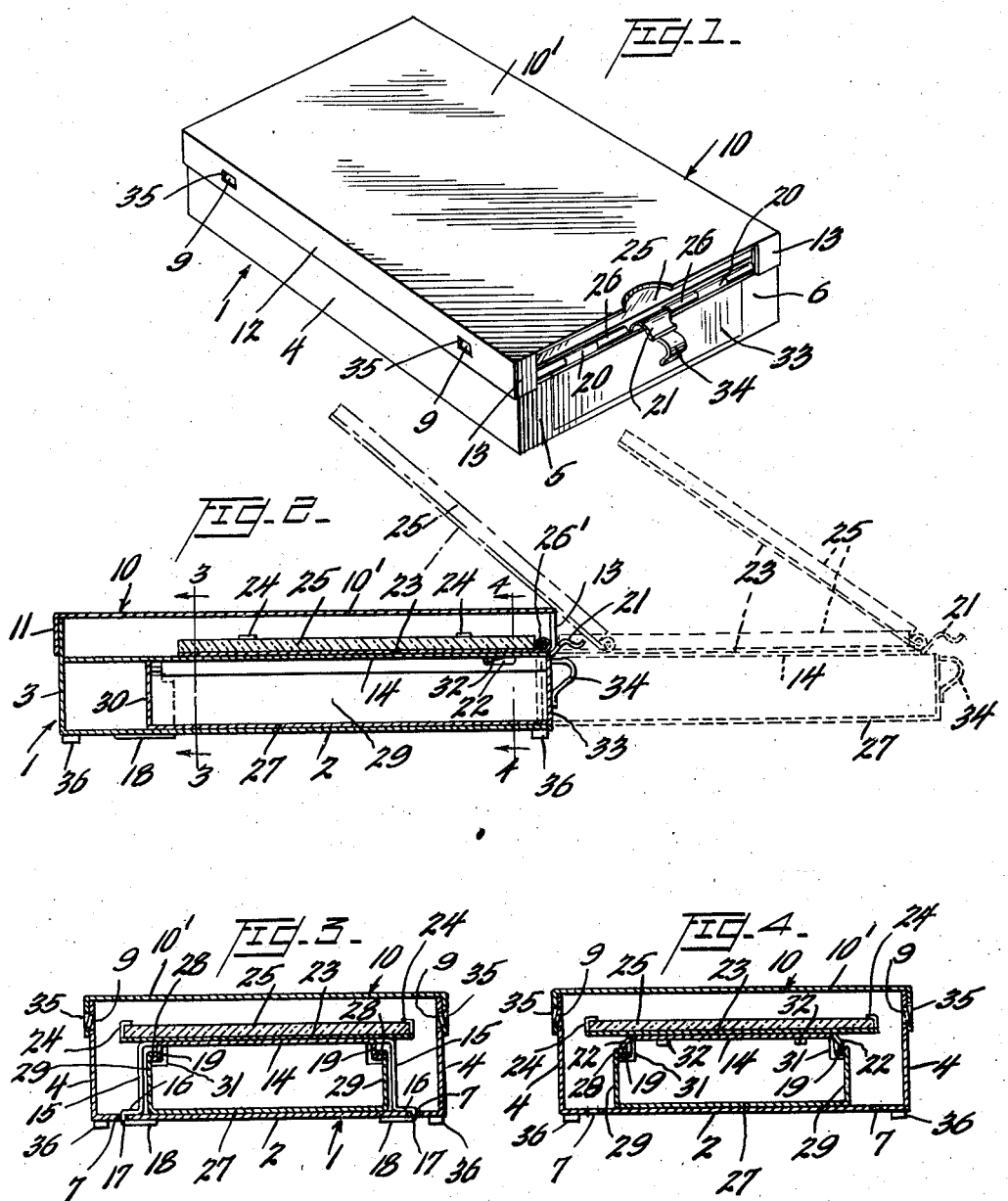

Aug. 27, 1946.  S. J. WINSLOW  2,406,450
VANITY FOR AUTOMOBILE COMPARTMENTS
Filed Aug. 17, 1945   2 Sheets-Sheet 2
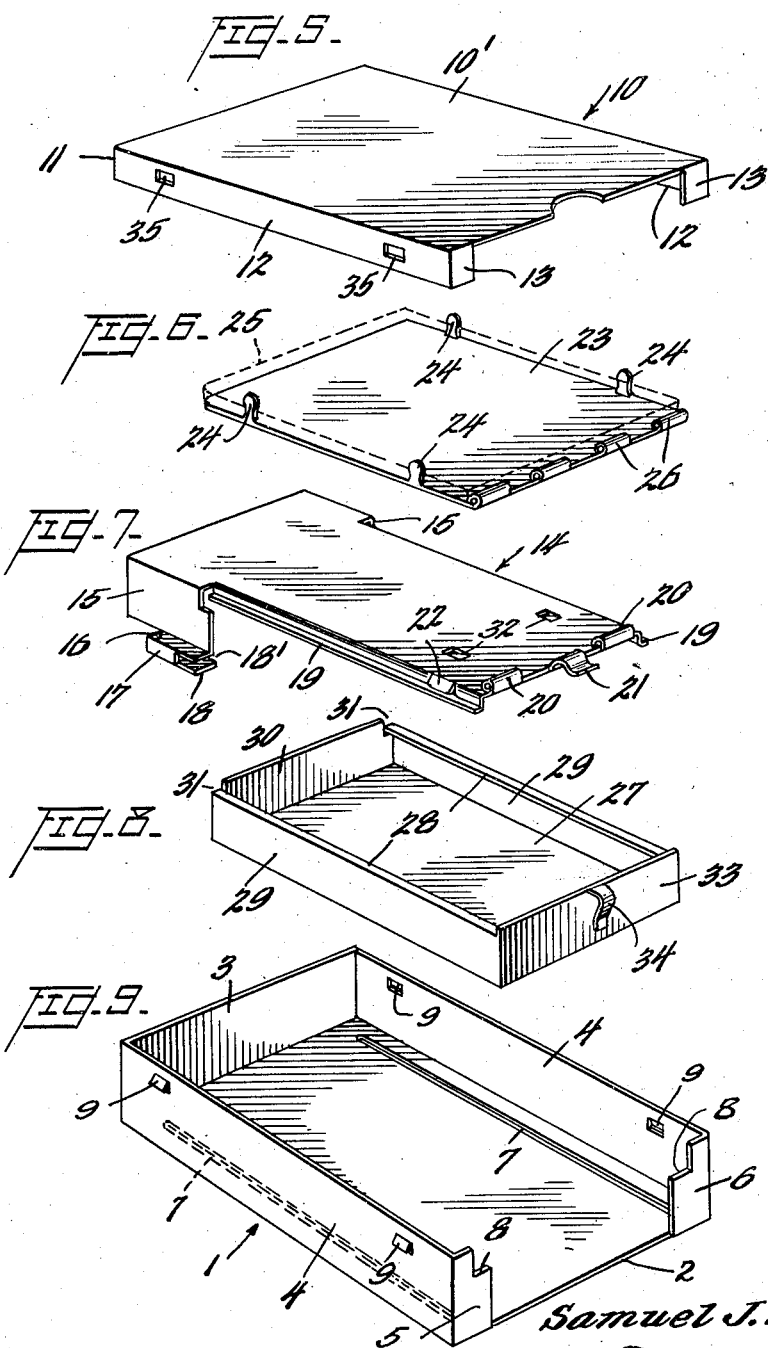

Patented Aug. 27, 1946

2,406,450

UNITED STATES PATENT OFFICE 2,406,450

VANITY FOR AUTOMOBILE COMPARTMENTS

Samuel J. Winslow, Providence, R. I.

Application August 17, 1945, Serial No. 611,033

3 Claims. (Cl. 132—79)

My invention relates to new and useful improvements in vanities for automobiles and more particularly to a vanity that may be secured within the glove compartment in the dash-board or may be fitted in any compartment that is situated in the back of the front seat of an automobile.

One of the objects of the present invention is to provide a vanity which consists of an outer casing or box-like structure that may be fastened to the bottom of a compartment, and in this casing will be a metal slide which, in turn, carries on its top a mirror frame and looking glass so that when the slide is pulled out of the casing, the mirror and its frame may be elevated and then the slide pulled back to arrange the desired angle of the mirror and its frame. Also, carried by this slide on its under surface is a drawer in which may be fitted a powder puff, rouge, lip stick or any other small articles.

Still another object of the invention is to provide a vanity wherein the same may be secured in the glove compartment of the automobile so that a mirror can be propped into place by pulling out a slide and then pushing in the slide so that the mirror may be arranged at the desired angle; and wherein if it is further desired to use a lip stick or powder puff, the same is readily accessible by pulling out the drawer carried by the slide.

On the other hand, to close the vanity it is only necessary to pull out the slide until the mirror frame can drop down to position and then the slide and mirror are pushed back into the casing.

Still another object of the invention is to provide a vanity where if it is not desired to pull out the mirror, just the drawer carried by the slide may be pulled out and anything removed and then the drawer pushed back into its casing.

Still another object of the invention is to provide a vanity that is made up of several metal parts that may be readily and easily stamped from stock and also quickly assembled so that the manufacturing cost is kept at a minimum.

With these and other objects in view, the invention consists in certain new and novel arrangements and combination of parts that will be hereinafter more fully described and pointed out in the claims.

Referring now to the drawings showing a preferred embodiment:

Fig. 1 is a perspective of my improved vanity;

Fig. 2 is a longitudinal sectional view, the dotted lines showing the slide carrying the drawer in its outer position and also showing how the mirror is supported when the slide is in its outer position;

Fig. 3 is a cross-sectional view taken on line 3—3 of Fig. 2;

Fig. 4 is a similar sectional view taken on line 4—4 of Fig. 2;

Fig. 5 is a perspective of the top cover;

Fig. 6 is a perspective of the mirror frame;

Fig. 7 is a perspective of the slide;

Fig. 8 is a perspective of the drawer; and

Fig. 9 is a perspective of the casing on which the cover fits.

Referring now more particularly to the several views and for the moment to Fig. 9, there is shown the box-like casing 1 which is provided with a bottom 2, rear wall 3, and the two like side walls 4. Also, at the front of the casing may be seen the two front pieces 5 and 6 as the remainder of the front is cut out to permit the drawer to slide through the front as will be shortly mentioned.

The bottom 2 is provided with two oppositely located longitudinal slots 7 (see Fig. 3) so that the slide shortly to be mentioned may move back and forth within the casing, but be retained against removal.

It will also be noticed that the front portions 5 and 6 are cut back to form the ledges 8, and it is on these ledges that the mirror frame partially rests and is guided when being pulled out, as will be later mentioned.

Also, on the two side walls 4 there are formed the little tongues 9 that are stamped out, which will fit into receptive openings in the cover 10 now to be described.

Referring to Fig. 5, where the cover 10 is seen in detail, there is the top 10' and there will be the rear wall 11 and the side walls 12 while the front wall is cut away to just leave the small opposite portions 13 which cover part of the front walls 5 and 6 of the casing as shown in Fig. 1.

I have not shown any means of fastening this casing to the bottom of a compartment in an automobile but any suitable means may be used such as small bolts and washers (not shown).

Reference is now made to the slide 14 which is clearly shown in Fig. 7. This consists of a flat metal strip with the two downwardly extending ears 15 located at the rear end on the sides of the slide, while projecting outwardly from each ear is the lug 16 which is then bent downwardly as at 17, and later bent again inwardly as at 18 to form an encompassing shoe 18' that fits within the receptive slots 7 in the bottom of the casing.

It will be understood that each lug 18 is not bent inwardly at the start, but is originally in a vertical position and after being passed into the slot 7, it is bent upwardly as shown in Fig. 7 so that this shoe contacts on the inner and outer surfaces of the bottom 2 of the casing, as illustrated in Fig. 3. Thus, when these lug portions 18 of the ears 15 are once fitted in place in the slots 7 of the casing, the slide can be moved into and out of the casing but cannot be removed therefrom.

This slide 14 is also provided with the outer extending tracks 19 on its opposite sides, and slidable on these tracks and the bottom of the casing 1 is the drawer soon to be mentioned.

The forward end of the slide is bent over to form the hinge eyelets 20 and one part is bent downwardly to form the slide pull 21.

Also, may be seen the small ears 22 near the forward end of the track which prevent the small drawer from tilting downwardly when the drawer is at the outer end of the slide.

Referring now to Fig. 6, there may be seen the mirror frame 23 which is slightly greater in width but less in length than the slide 14, and is provided with the up-turned lips 24 on its sides so that after the mirror 25 (see Fig. 2) is placed in the frame, these lips may be turned down to hold the mirror. The forward end of the frame is provided with a row of hinge eyelets 26 that cooperate with the eyelets 20 after which a pintle or rod 27 is passed through the eyelets in the usual manner so that the mirror frame can tilt with relation to its slide, and rest on the slide and ledges 8 when not in use.

Referring now to Fig. 8, there may be seen the small metal drawer 27 which has the inwardly turned ledges 28 or tracks that in turn fit over the tracks 19 on the slide 14. These ledges 28 are formed along the entire upper edge of the side walls 29 of the drawer and it will be noticed that the rear wall 30 is cut out as at 31 so that when assembling or fitting the drawer to the slide 14, the tracks 19 of the slide 14 may be fitted through these openings 31 and under the ledges 28 and the drawer moved into position.

After the drawer is in position, two lips 32 that have been previously cut in the top surface of the slide 14 are pressed downwardly to form stops so that when the drawer is pulled out with relation to the slides, the two lips 32 will impinge against the rear wall 30 and prevent the drawer from being removed from the slide.

On the front wall 33 of the drawer will be the drawer pull 34 for convenience of opening and closing the drawer.

After the slide 14, the mirror frame 23, and drawer 27 are fitted within the casing 1, the cover 10 will be fitted and the small tongues 9 may be fitted within the openings 35 in the cover 10 to complete the assembling of the vanity.

Also, as may be seen in Fig. 2 on the bottom of the casing may be small rubber feet or washers 36 so that when the vanity is fastened on a support, the shoes 18' on the ears 15 of the slide 14 will be unobstructed.

The operation of the vanity is exceedingly simple. Supposing it is desired to just pull out the drawer 27—the drawer pull 34 will be grasped and the drawer sliding on its supporting tracks 19 of the slide 14 and the bottom of the casing may be readily pulled out and any article removed or placed within the drawer, after which the drawer will be again moved inwardly on its supporting tracks 19. In this instance the slide 14 has remained stationary within its casing.

Now, if it is desired to utilize the mirror 25, the slide pull 21 will be grasped in the fingers and pulled outwardly and the guiding shoes 18' operating in the slot 7 permits the slide to be pulled outwardly with a free and easy motion.

The slide will be pulled outwardly to its fullest extent to thus permit the shorter mirror frame 23 to be free of the top casing as shown in Fig. 2. The mirror frame 23 will then be raised by the hand and the slide 14 again pushed inwardly until the mirror frame 23 rests against the forward edge of the top or cover 10. The slide may then be pushed still slightly inwardly and outwardly until the desired tilt of the mirror is obtained. Of course, when the slide has been pulled out, it has carried the drawer 27 with it and if it is desired to remove something from the drawer, the drawer 27 may then be pulled outwardly on its slide 14 as previously mentioned.

To again close the vanity, the slide 14 is pulled out to its fullest extent, the mirror frame 23 dropped until it rests on its slide and the drawer 27 if it be open, pushed inwardly with relation to its slide 14, and then the slide 14 and the drawer 27 pushed back into the casing 1.

As heretofore mentioned, the lips 32 prevent the drawer from being pulled away from the slide and the small ears 22 just above the track 19 will prevent the drawer 27 from tilting at its forward end when the drawer is in its outermost position.

From the foregoing it will be seen that I have provided a vanity wherein all parts except the glass mirror may be readily stamped from stock material and the parts readily assembled and secured so that after the article is once assembled, it will withstand considerable usage.

The vanity may be made of relatively cheap metal and then nickel plated or chromium plated to provide a neat appearance.

Many slight changes may be made without departing in any way from the spirit or scope of the invention.

Having thus described the same, what I claim as new and desire to secure by Letters Patent is:

1. In a vanity for automobiles and the like a box-like casing having an opening in its front face, a slide mounted in said casing for movement in and out of said opening, a frame and mirror pivoted to the forward edge of said slide and normally carried on the upper surface of said slide, the said slide also carrying a drawer on its under surface, means on the slide to prevent its removal from the casing, means also on the slide to prevent the removal of the drawer from the slide; the pivoted frame capable of being supported against the forward end of the casing when pulled out from the casing and raised from its normal position; and the drawer slideably movable with relation to both the casing and its slide.

2. A vanity for automobiles including a casing having a front opening, a horizontal slide mounted in said casing for movement in and out of said casing, a tiltable mirror frame and mirror pivoted to the outer end of said slide, a drawer slideably mounted on the under surface of said slide and capable of movement both with the slide and independent of the slide; the mirror frame adapted to rest against the forward end of the casing after the slide and drawer have been pulled outwardly, the mirror elevated and the slide returned within the casing, the angularity of the tilting mirror frame depending on the distance that the slide is positioned outwardly from the forward end of the casing.

3. A vanity for automobiles including a casing having a front opening, a horizontal slide mounted in said casing for movement in and out of said opening, means for guiding the slide and holding it against removal from said casing, a tiltable mirror frame and mirror pivoted to the forward edge of the slide, tracks on the bottom of the slide, a drawer slideably mounted in said tracks, means for preventing the removal of the drawer from its slide, the drawer capable of movement both with the slide and independent thereof, and the mirror frame being adapted to rest against the forward edge of the top of the casing when the mirror frame is wholly out of the casing and the slide is partially out of said casing.

SAMUEL J. WINSLOW.